United States Patent
Reeves et al.

(10) Patent No.: US 7,563,007 B2
(45) Date of Patent: Jul. 21, 2009

(54) BUMPER COVER AND LAMP HOUSING ASSEMBLY WITH INTEGRAL FASTENERS FOR INDEPENDENT REMOVAL OF PARTS FROM A VEHICLE

(75) Inventors: Scott Reeves, South Lyon, MI (US); George Bowman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 11/566,486

(22) Filed: Dec. 4, 2006

(65) Prior Publication Data

US 2008/0130307 A1   Jun. 5, 2008

(51) Int. Cl.
*B60Q 1/00* (2006.01)
(52) U.S. Cl. .................. 362/505; 362/368; 362/549
(58) Field of Classification Search ............... 362/362, 362/368, 457, 458, 489, 490, 493, 505, 546, 362/548, 549
See application file for complete search history.

(56) References Cited

U.S. PATENT DOCUMENTS

| | | | | |
|---|---|---|---|---|
| 2,730,396 A | * | 1/1956 | Johnson | 362/505 |
| 3,639,748 A | * | 2/1972 | Pearson et al. | 362/505 |
| 5,154,505 A | * | 10/1992 | Sasamoto | 362/368 |
| 7,338,192 B2 | * | 3/2008 | Kreutzberg | 362/549 |
| 2005/0190573 A1 | | 9/2005 | Schwab | |
| 2006/0007694 A1 | | 1/2006 | Kim | |

FOREIGN PATENT DOCUMENTS

| | | | |
|---|---|---|---|
| JP | 06-094018 | | 4/1994 |
| JP | 06270736 A | * | 9/1994 |
| JP | 80-584498 | | 3/1996 |
| JP | 2000-335336 | | 12/2000 |
| JP | 2004/322910 | | 11/2004 |

* cited by examiner

*Primary Examiner*—Y My Quach Lee
(74) *Attorney, Agent, or Firm*—Dickinson Wright PLLC; Greg Brown

(57) ABSTRACT

A bumper cover and lamp housing assembly (14) ("assembly") includes a bumper cover (22) and a lamp housing (24) that is releasably attached to bumper cover (22). Bumper cover (22) has a one-piece construction (30) with one of a tongue fastener (28) and a groove fastener (26). Lamp housing (24) has a single-piece construction (46) with the other of the tongue fastener (28) and groove fastener (26). Tongue fastener (28) is slidably attached directly to groove fastener (26).

13 Claims, 3 Drawing Sheets

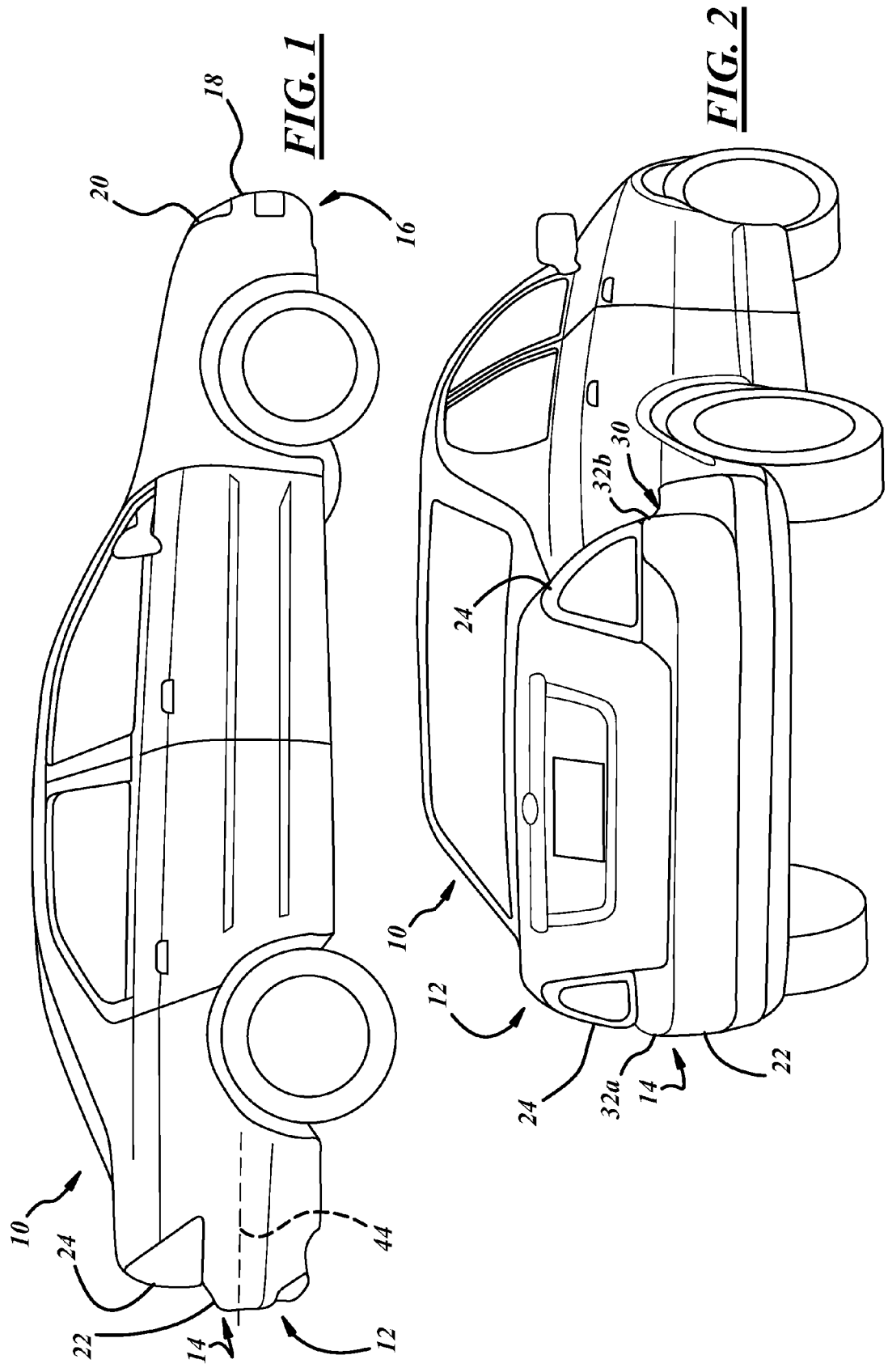

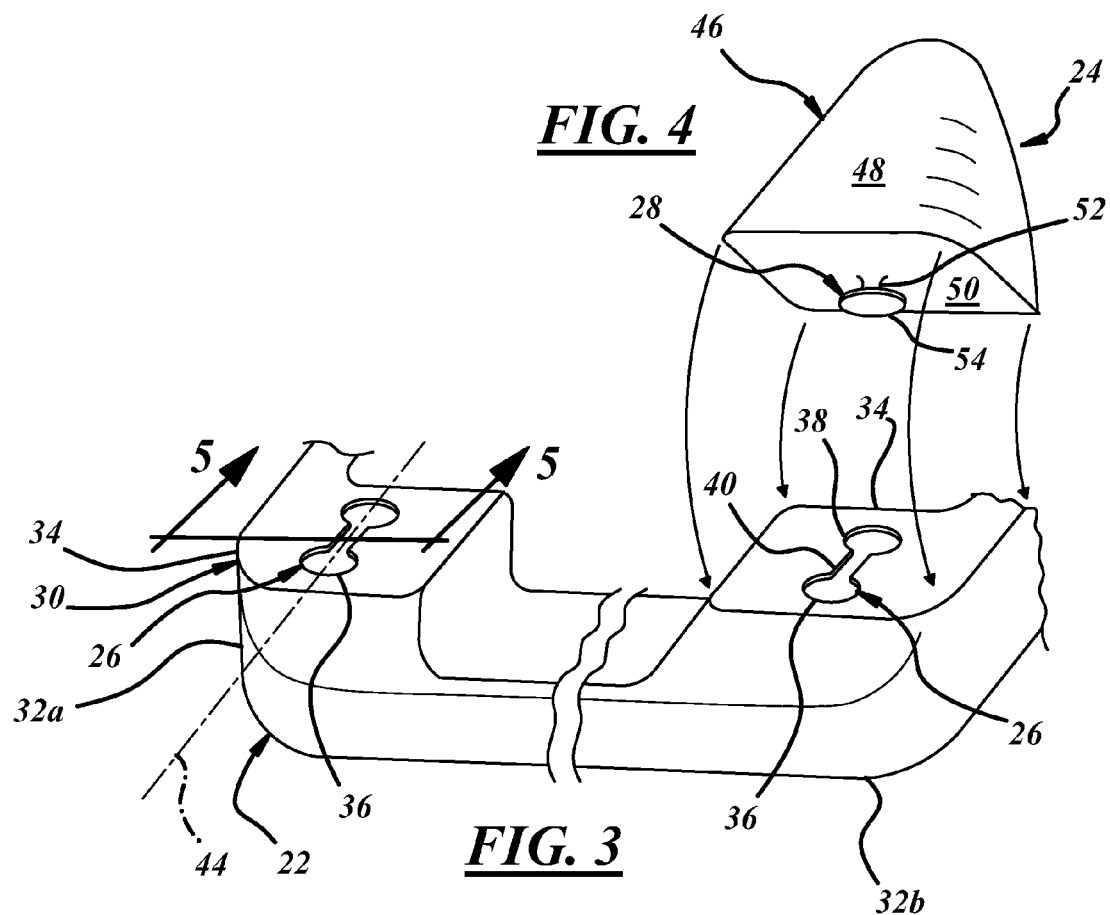
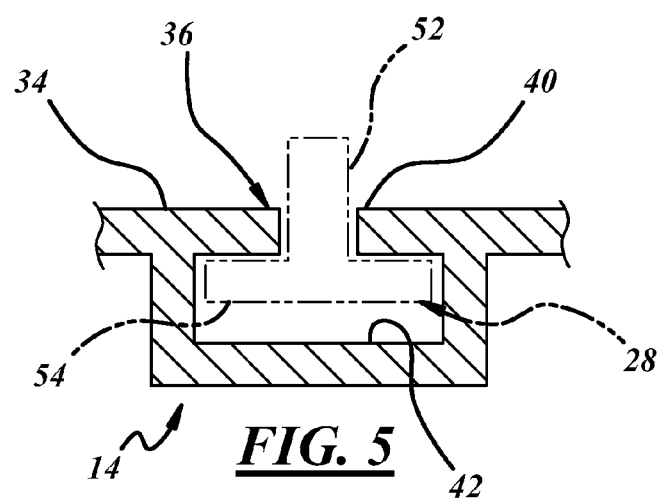

BUMPER COVER AND LAMP HOUSING ASSEMBLY WITH INTEGRAL FASTENERS FOR INDEPENDENT REMOVAL OF PARTS FROM A VEHICLE

TECHNICAL FIELD

The present invention relates generally to bumper cover and lamp housing assemblies ("assemblies") for a vehicle, and more particularly to an assembly with parts that can be independently removed from the vehicle for service.

BACKGROUND

Automotive manufacturers have produced vehicles having assemblies with plastic bumper covers that are supported substantially across their width except for their outboard ends. For that reason, the outboard ends can be deflected a significant distance under a generally low force. The outboard ends can be likewise deflected in high temperature conditions.

Current vehicles include assemblies having a bumper cover with outboard ends attached to and supported by lamp housings. This assembly typically includes the bumper cover, two lamp housings, two separate lenses, and a series of fasteners. The assembly typically has a generally high number of parts, which are attached together in a way that requires removal of the entire assembly when servicing only the bumper or only the lamp. This can lengthen repair times, increase labor, and thus increase costs. Also, removal of the entire assembly can result in damage to the parts that were not intended to be serviced.

It would therefore be desirable to provide a bumper cover and lamp housing assembly that decreases repair times, labor, costs, and the risk of damage to non-serviced parts.

SUMMARY OF THE INVENTION

A bumper cover and lamp housing assembly ("assembly") is provided. Assembly includes a bumper cover and a lamp housing that is releasably attached to bumper cover. Bumper cover has a one-piece construction with a tongue fastener or a groove fastener. Lamp housing has a single-piece construction with the other of the tongue fastener and the groove fastener. Tongue fastener is slidably attached directly to groove fastener.

One advantage of the invention is that an assembly is provided that has fewer parts than conventional bumper cover and lamp housing assemblies.

Another advantage of the invention is that an assembly is provided that decreases assembly time, labor, and costs when accessing one of its parts.

Yet another advantage of the invention is that an assembly is provided that allows for its parts to be independently removed for service or replacement.

Still another advantage of the invention is that an assembly is provided that decreases the risk of damage to its parts that are not being serviced or replaced.

Yet another advantage of the invention is that an assembly is provided that supports the outboard ends of a bumper cover.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention:

FIG. 1 is a side plan view of a vehicle with a rear bumper cover and tail-lamp housing assembly, according to one embodiment of the invention;

FIG. 2 is a rear perspective cutaway view of the assembly shown in FIG. 1;

FIG. 3 is a top perspective view of the rear bumper cover shown in FIG. 2;

FIG. 4 is a bottom perspective view of one of the tail-lamp housings shown in FIG. 2;

FIG. 5 is a cross-sectional view of the rear bumper cover shown in FIG. 3, as taken along line 5-5;

DETAILED DESCRIPTION OF THE INVENTION

Figure 6:
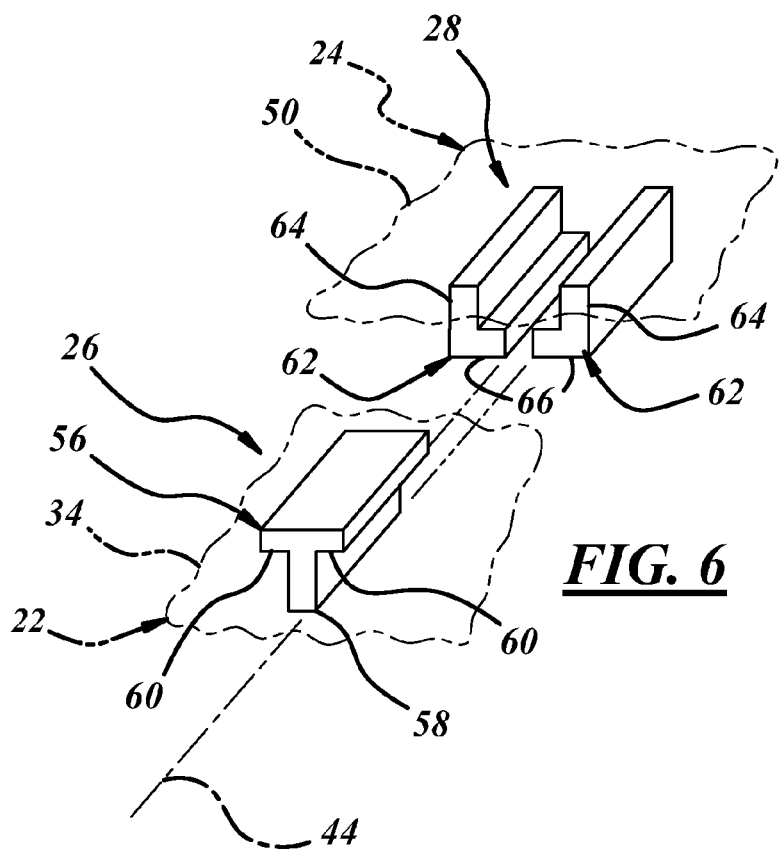
FIG. 6 is a cutaway perspective view of the assembly shown in FIG. 2, illustrating fasteners according to another embodiment of the invention.

In the following figures, the same reference numerals are used to identify the same components in the various views.

Referring to FIGS. 1 and 2, there is shown a vehicle 10 having a rear-end structure 12 with a rear bumper cover and tail-lamp housing assembly 14 ("assembly"), according to one embodiment of the invention. It is contemplated that assembly 14 can also be adapted for use in a front-end structure 16 of the vehicle 10 (shown in FIG. 1) with a front bumper cover 18 and headlamp housing 20.

Assembly 14 includes a rear bumper cover 22 ("bumper cover") and two tail-lamp housings 24 ("lamp housings") releasably attached to bumper cover 22. As detailed below, assembly 14 provides for the removal of only bumper cover 22 or only lamp housing 24 without removing the other. This feature is beneficial for eliminating the need to remove the entire assembly 14 including the part that does not require repair or other kind of accessibility. In addition, assembly 14 has substantially few parts as compared with conventional assemblies. For these reasons, assembly 14 decreases assembly time, labor, costs, and the risk of damage to its parts.

Bumper cover 22 has a first fastener 26 (shown in FIG. 3) that releasably attaches to a second fastener 28 extending from lamp housing 24 (shown in FIG. 4). First fastener 26 and second fastener 28 form a tongue-in-groove fastening pair.

In particular, bumper cover 22 has an elongated one-piece plastic construction 30 (best shown in FIG. 2) formed with a pair of opposing ends 32a, 32b. As exemplified by the embodiment illustrated in FIG. 3, each end 32a, 32b of bumper cover 22 has a top wall portion 34 with first fastener 26. However, first fastener 26 can be formed in other suitable portions of bumper cover 22 as styling dictates. In the illustrated embodiment, first fastener 26 is a notched slot 36 in top wall portion 34. Notched slot 36 has a first portion 38 and a second portion 40. First portion 38 is sized to receive second fastener 28 (shown in FIG. 4). Second portion 40 is sized smaller than second fastener 28 for remaining attached to the same. Notched slot 36 further includes a channel 42 (best shown in FIG. 5) beneath first and second portions 38, 40 for sliding second fastener 28 along the slot 36. In the illustrated embodiment, channel 42 is positioned for sliding second fastener 28 along a longitudinal axis 44 (shown in FIG. 3) of vehicle 10 extending between front-end structure 16 and rear-end structure 12. It is contemplated that first and second fasteners 26, 28 can be otherwise configured for sliding lamp housing 24 and bumper cover 22 in a variety of directions. It will also be understood that the portion of bumper cover 22 forming channel 42 beneath first and second portions 38, 40 can be omitted.

Referring to FIG. 4, lamp housing 24 has a single-piece plastic construction 46 formed with a lens portion 48, a bottom wall portion 50, and second fastener 28. Lens portion 48 extends from bottom wall portion 50 by a predetermined angle as styling dictates. Bottom wall portion 50 is substantially flat and includes second fastener 28 protruding therefrom. Bottom wall portion 50 is parallel to and supported by top wall portion 34 (shown in FIG. 3) when first and second fasteners 26, 28 are engaged. It is understood that top and bottom wall portions 34, 50 can have other suitable non-planar constructions as desired.

Second fastener 28 is formed with a post 52 and a disc 54. Post 52 extends orthogonally from bottom wall portion 50 with disc 54 extending radially outward from post 52. Disc 54 is sized sufficiently narrow for inserting through first portion 38 of notched slot 36 and sliding along channel 42 of same (shown in FIG. 3). Also, disc 54 (best shown in FIGS. 4 and 5) is sized wider than second portion 40 of notched slot 36 so as to retain disc 54 in channel 42 and attach lamp housing 24 to bumper cover 22.

It is contemplated that first and second fasteners 26, 28 can be a variety of other suitable tongue-in-groove fastening pairs. For instance, in the embodiment illustrated in FIG. 6, first fastener 26 is a T-shaped protrusion 56 extending from top wall portion 34 of bumper cover 22. T-shaped protrusion 56 includes a first post 58 and first detents 60. Further, second fastener 28 is a pair of L-shaped protrusions 62 extending from bottom wall portion 50 of lamp housing 24. Each L-shaped protrusion 62 has a second post 64 and a second detent 66. In this regard, L-shaped protrusions 62 receive T-shaped protrusion 56 with first and second detents 60, 66 bearing a vertical load between lamp housing 24 and bumper cover 22. Likewise, it is understood that first and second posts 58, 64 bear lateral and vertical loads.

Figure 7:
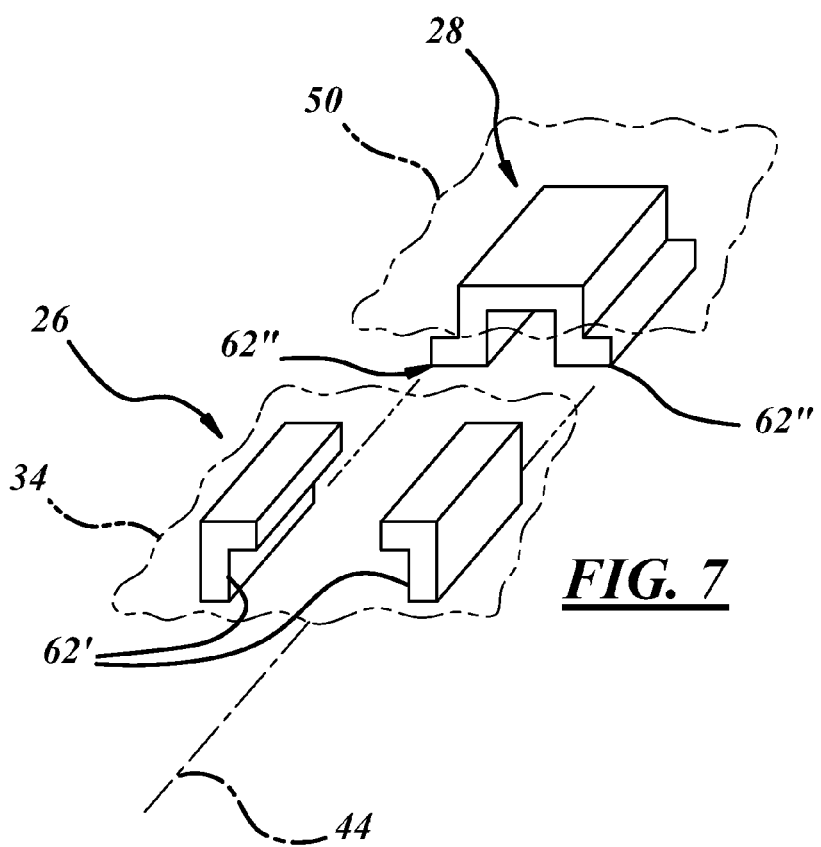
FIG. 7 is a cutaway perspective view of the assembly shown in FIG. 2, illustrating fasteners according to yet another embodiment of the invention.

In the embodiment illustrated in FIG. 7, first fastener 26 is a pair of inward-facing L-shaped protrusions 62' forming a groove, and second fastener 28 is a pair of outward-facing L-shaped protrusions 62" forming a tongue.

It is also contemplated that aforementioned first and second fasteners 26, 28 can be interchanged between bumper cover 22 and lamp housing 24.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A bumper cover and lamp housing assembly, comprising:
   a bumper cover;
   a lamp housing releasably attached to said bumper cover;
   said bumper cover having a one-piece construction with one of a tongue fastener and a groove fastener, with said tongue fastener comprising a T-shaped protrusion extending from one of said bumper cover and said lamp housing;
   said lamp housing having a single-piece construction with the other of said tongue fastener and said groove fastener; said tongue fastener slidably attached directly to said groove fastener.

2. The bumper cover and lamp housing assembly recited in claim 1 wherein said bumper cover is formed from injection-molded plastic.

3. The bumper cover and lamp housing assembly recited in claim 1 wherein said lamp housing is formed from injection-molded plastic.

4. The bumper cover and lamp housing assembly recited in claim 1 wherein said tongue fastener includes a post and a disc extending from said post.

5. The bumper cover and lamp housing assembly recited in claim 4 wherein said groove fastener is a notched slot formed in one of said bumper cover and said lamp housing, with a first portion of said notched slot sized to receive said disc and a second portion of said notched slot sized smaller than said disc.

6. The bumper cover and lamp housing assembly recited in claim 1 wherein said groove fastener is a pair of L-shaped protrusions extending from one of said bumper cover and said lamp housing.

7. The bumper cover and lamp housing assembly recited in claim 1 wherein said tongue fastener is a pair of L-shaped protrusions extending from one of said bumper cover and said lamp housing.

8. A bumper cover and lamp housing assembly, comprising:
   a bumper cover;
   a lamp housing releasably attached to said bumper cover;
   said bumper cover having a one-piece construction with a first fastener, wherein said first fastener extends from a top Wall portion of said bumper cover with said top wall portion substantially parallel to said bottom wall portion of said lamp housing;
   said lamp housing having a single-piece construction with a lens portion, a bottom wall portion, and a second fastener;
   said bottom wall portion extending from said lens portion by a predetermined angle;
   said second fastener protruding from said bottom wall portion along a reference line substantially orthogonal to said bottom wall portion;
   said first fastener slidably attached directly to said second fastener so as to prevent separation between said bottom wall portion of said lamp housing and said top wall portion of said bumper cover substantially along said reference line;
   said first fastener being one of a tongue fastener and a groove fastener;
   said second fastener being the other of said tongue fastener and said groove fastener.

9. The bumper cover and lamp housing assembly recited in claim 8 wherein said first fastener includes a first post and a first detent extending from said first post.

10. The bumper cover and lamp housing assembly recited in claim 9 wherein said first post extends substantially orthogonally from said bottom wall portion of said lamp housing.

11. The bumper cover and lamp housing assembly recited in claim 8 wherein said second fastener includes a second post and a second detent extending from said second post.

12. The bumper cover and lamp housing assembly recited in claim 11 wherein said second post extends substantially orthogonally from said top wall portion of said bumper cover.

13. A vehicle comprising:
   said bumper cover and lamp housing assembly recited in claim 8;
   a front-end structure;
   a rear-end structure;
   a longitudinal axis extending between said front-end structure and said rear-end structure;
   said bumper cover and lamp housing assembly integrated within at least one of said front-end structure and said rear-end structure.

* * * * *